United States Patent

[11] 3,601,559

[72] Inventor Edson S. Hineline, Jr.
Charlottesville, Va.
[21] Appl. No. 883,024
[22] Filed Dec. 8, 1969
[45] Patented Aug. 24, 1971
[73] Assignee Stromberg-Carlson Corporation
Rochester, N.Y.

[54] HOOKSWITCH AND HOLD BUTTON RELEASE MECHANISM
9 Claims, 9 Drawing Figs.

[52] U.S. Cl. .......... 179/164, 179/99
[51] Int. Cl. .......... H04m 1/08
[50] Field of Search .......... 179/167, 100 C, 99, 164

[56] References Cited
UNITED STATES PATENTS

| | | | |
|---|---|---|---|
| 2,199,686 | 5/1940 | Beyland | 179/99 |
| 3,055,981 | 9/1962 | Smith et al. | 179/160 X |

*Primary Examiner*—William C. Cooper
*Attorney*—Charles C. Krawczyk

ABSTRACT: A multiline wall telephone set includes a line select and hold button switch assembly with a hold button release mechanism, and also a hookswitch mounted in a handset cradle. A lever mechanism is coupled between the cradle and the hold button release mechanism. The hookswitch and the hold button release mechanism are separately and sequentially operated by the weight of the telephone handset when positioned in the cradle.

EDSON S. HINELINE JR.
INVENTOR.

BY Charles C. Krawczyk

ATTORNEY

EDSON S. HINELINE JR.
INVENTOR.

BY Charles C. Krawczyk

ATTORNEY

EDSON S. HINELINE JR.
INVENTOR.

BY Charles C. Krawczyk

ATTORNEY

HOOKSWITCH AND HOLD BUTTON RELEASE MECHANISM

BACKGROUND OF THE INVENTION

This invention relates to telephone sets in general and more particularly to multiline wall telephone sets having line select and hold button switch assemblies.

In recent years there has been an increased demand for telephone sets having access to more than one telephone line. A means for line selection presently used in desk telephones is a mechanical switching arrangement generally called a line select and hold button assembly. The select buttons allow the user to select any one of a plurality of available lines. Hold buttons are used to hold a calling line in its busy condition to enable the subscriber to answer other calls on different lines without losing the prior-calling parties. It is important that none of the hold buttons remain in hold position after the calls have been completed and thereby undesirably hold lines in a busy condition. In the prior art multiline telephones, the hookswitch that provides the "off-hook" and "on-hook" circuit connections and the release mechanism for the hold buttons are coupled for actuation by a common lever system. The lever system is connected to a pivotable handset cradle so that when the handset is placed in the cradle, the cradle is pivoted to cause the common lever system to actuate both the button release mechanism and the hookswitch. It is preferred that the arrangement be such that the common lever mechanism actuates the hookswitch before actuating the release mechanism to prevent undesirable switching noises in the receiver.

A great cost savings can be realized if standard existing multiline desk telephone sets can be converted into multiline wall telephone sets so that a large portion of existing components can be used in both. This greatly reduces the cost of such wall telephones by minimizing engineering costs and by allowing the use of existing manufacturing and assembling facilities.

In the wall telephone, a different type of cradle must be used because the telephone baseplate to which the telephone components are attached is mounted in a vertical position rather than a horizontal position. When the handset rests in the cradle of the wall telephone, its weight vector is parallel to the baseplate rather than at a right angle to the baseplate. Therefore, the position of the handset cradle relative to the select and hold button assembly will generally change thus limiting the amount of motion available for lever action for restoring the hold buttons to their release position. Furthermore, the desk telephone modified for wall operation must provide a positive actuation of the hold button release mechanism and the hookswitch. In addition to the foregoing, the desk telephone modified for wall operation should be able to provide a proper time sequence in the operation of the hold button release mechanism and the hookswitch.

It is therefore an object of this invention to provide a novel and low cost means for modifying a multiline desk telephone for operation as a multiline wall telephone.

It is also an object of this invention to provide a new and improved mechanism for multiline wall telephones for releasing hold buttons while separately actuating the hookswitch.

Another object of this invention is to provide a new and improved mechanism for multiline wall telephones for separate and sequential operation of a hookswitch and a button release mechanism in the correct timing sequence.

BRIEF DESCRIPTION OF THE INVENTION

A multiline wall telephone set of the invention includes a line select and hold button switch assembly with a hold button release mechanism, a handset cradle having a hookswitch mounted therein, and lever means coupling the handset cradle to the hold button release mechanism. When the handset is removed from the cradle, resilient means positions the lever means so that the hold buttons can be operated. The arrangement being such that the weight of the handset when positioned in the cradle actuates the hookswitch and operates the lever means to actuate the hold button release mechanism.

DESCRIPTION OF THE PREFERRED EMBODIMENT

Figure 1:
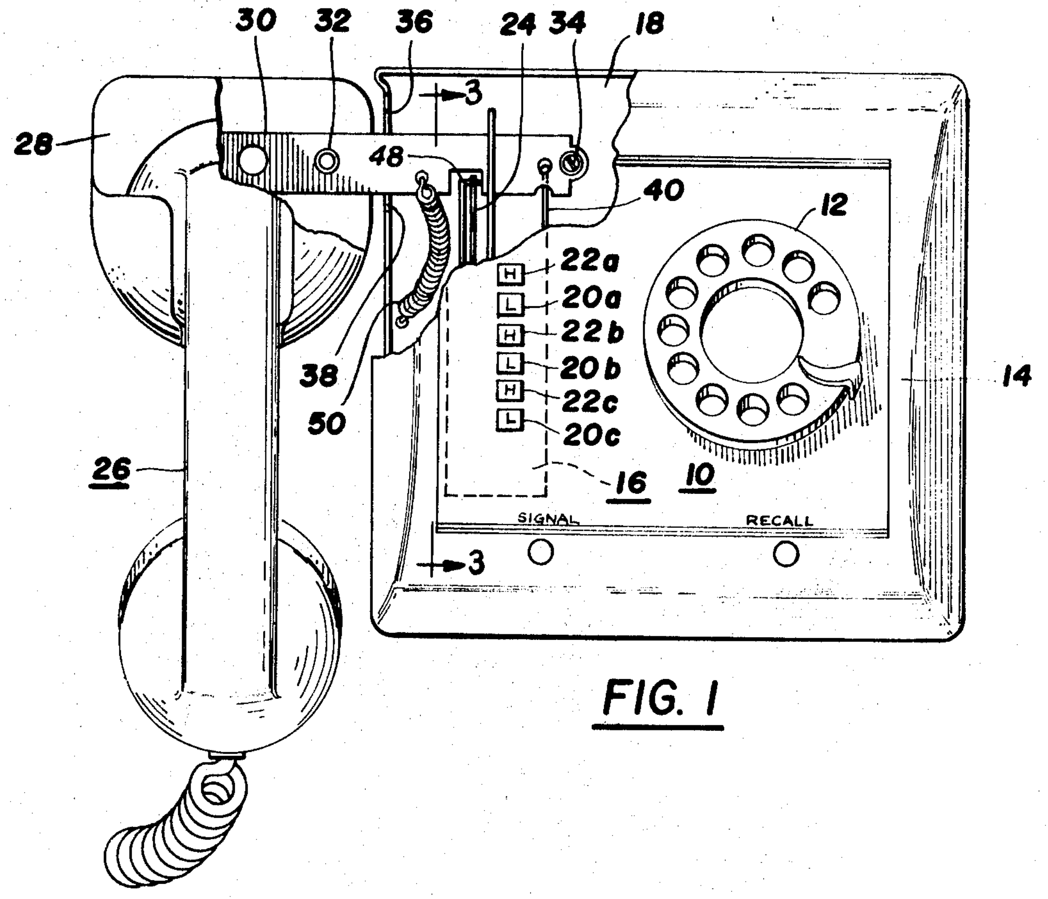
FIG. 1 shows a partial cutaway front view of a multiline wall telephone set including the invention with the receiver in the cradle.
Figure 3:
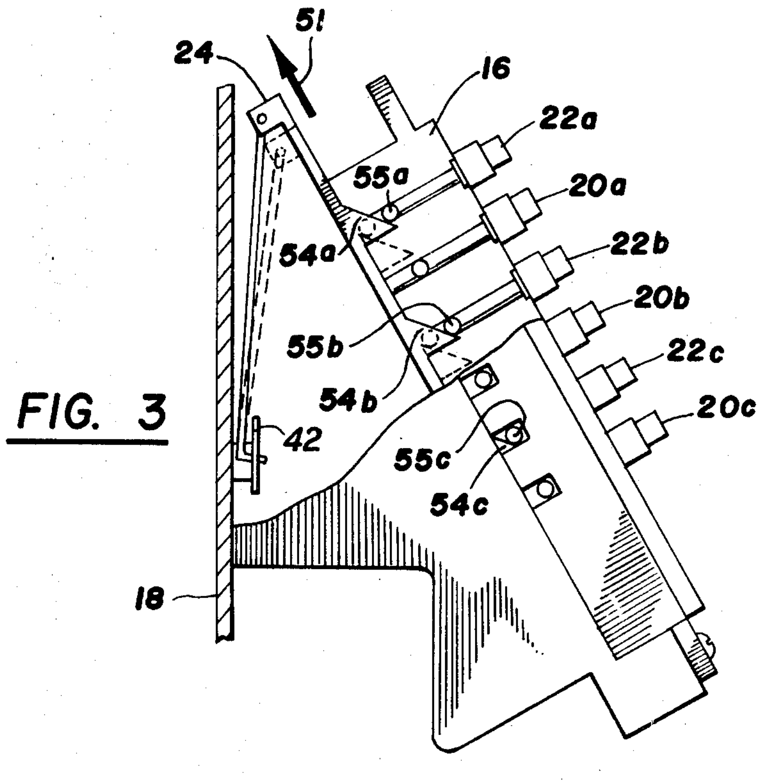
FIG. 3 shows a sectional view of the telephone set of FIG. 1 taken along lines 3—3 illustrating the hold button release mechanism.
Figure 4:
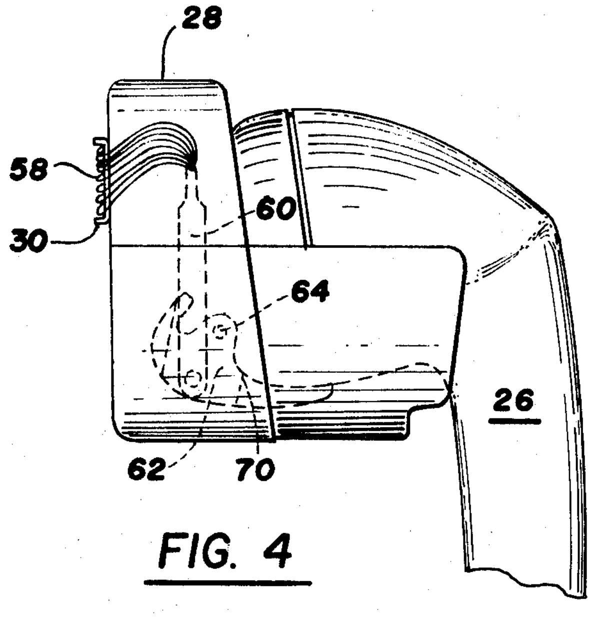
FIG. 4 illustrates a side view of the handset cradle of FIG. 1 with the handset in place and a hookswitch shown in phantom in the "on-hook" condition.
Figure 9:
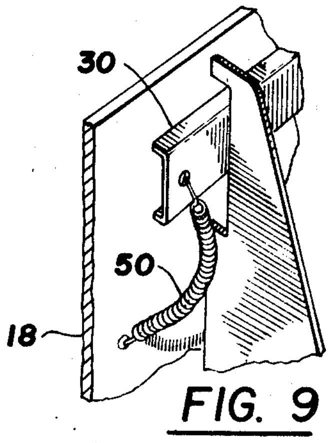
FIG. 9 shows a sectional view of FIG. 2 taken along the lines 9—9 to illustrate the attachment of a constant force spring.

A multiline wall telephone set 10 embodying the invention includes a dial assembly 12, a cover 14, and a conventional line select and hold button assembly 16 mounted on a baseplate 18. The line select and hold button assembly 16 is adapted to be connected to a plurality of telephone lines in a manner so that when a select button 20 *a–c* is depressed, the corresponding telephone line is selected for use, and when the associated hold button 22 *a–c* is depressed, the selected line is placed in a hold condition. The hold button remains depressed until mechanically released by the motion of a button release cam 24 (FIG. 3). The telephone set also includes a conventional handset 26 that can be positioned in a handset cradle 28 as illustrated in FIGS. 1 and 4.

In use, the telephone is mounted by fastening the baseplate 18 to a vertical member, such as a wall, so that the telephone handset 26, when positioned with the receiver in the cradle 28, extends along the wall in a generally vertical position with its weight vector extending generally parallel to the base plate 18.

The cradle 28 is fixedly attached to one end of a lever arm 30 by screws 32 (only one shown). The other end of the lever arm 30 is pivotally connected to the baseplate 18 by a screw 34 for movement in a plane parallel to the baseplate 18. The baseplate 18 includes a pair of stops 36 and 38 which limit the motion of the lever arm 30 in the up-and-down direction, respectively.

Figure 2:
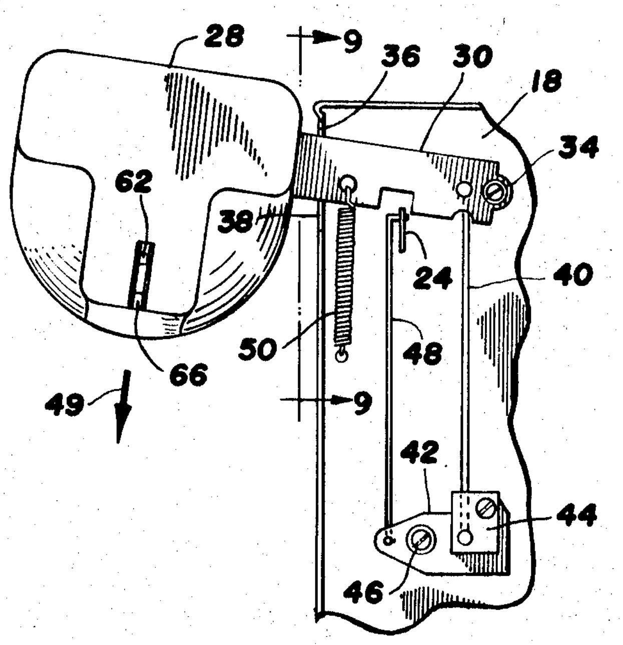
FIG. 2 shows a partial cutaway front view of a portion of the multiline wall telephone of FIG. 1 with the receiver removed from the cradle.

A lever mechanism for releasing any depressed hold button 22 *a–c* includes a pair of rods 40 and 48 connected to opposite sides of a pivotal lever 42. The rod 40 has one end connected to the lever arm 30 and the other end connected to the lever 42 by an adjustable plate 44. The lever 42 is pivotally attached to the baseplate 18 by screw 46. The adjustable plate 44 provides a means for presetting the effective length of the rod 40. The other rod 48 is connected between the hold button release cam 24 and the lever 42 in such a way that motion of the lever arm 30 causes the rods 40 and 48 to move in opposite directions. The downward motion of the lever arm 30 (illustrated by the arrow 49 in FIG. 2) causes the rod 40 to pivot the lever 42 and move the rod 48 which in turn moves the button release cam 24 in a direction designated by the arrow 51 (FIG. 3) to cause the triangular shaped projections 54 *a–c* to urge against the button projections 55 *a–c* to force any depressed hold buttons 22 *a–c* outward to their release positions.

A spring 50 is connected between the baseplate 18 and the lever arm 30. The resiliency of the spring 50 is selected so that it is overcome by the weight of the handset and still provides a sufficient force to assure that when the handset 26 is removed, the lever arm 30 is pivoted to the stop 36 and the release mechanism including cam 24 and projections 54 *a–c* is positioned so that the hold buttons 22 *a–c* can be operated. When the handset 26 is placed in the cradle 28, its weight overcomes the force of the spring 50 to cause the lever arm 30 to pivot downward toward the stop 38, and via the rods 40 and 48 move the cam 24 in a direction so that the cam projections 54 *a–c* engage the button projections 55 *a–c* of any depressed hold buttons, to force any of the depressed hold buttons into their release positions (as illustrated in FIG. 3).

Figure 5:
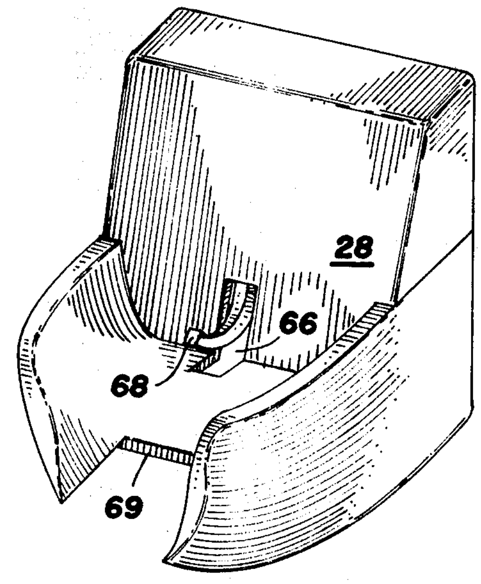
FIG. 5 shows an isometric view of the handset cradle of FIG. 1 with the handset removed and shows the hookswitch actuator in the "off-hook" condition.
Figure 7:
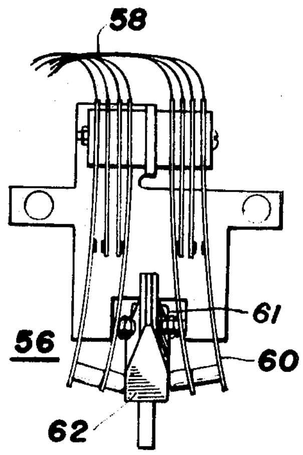
FIG. 7 shows the contacts of the hookswitch of FIG. 4 in the "on-hook" condition.
Figure 6:
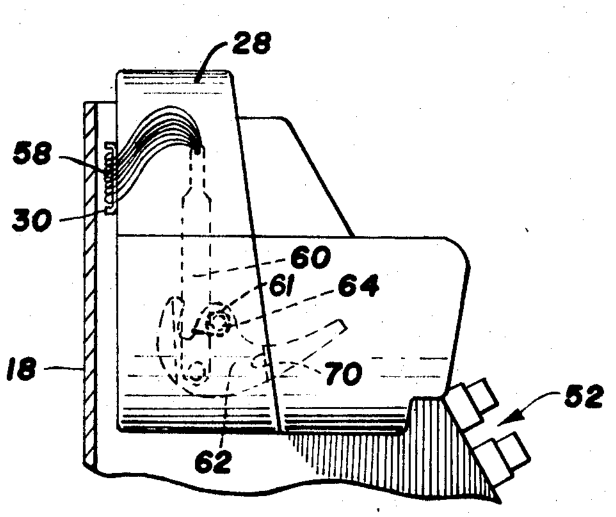
FIG. 6 illustrates a side view of the handset cradle of FIG. 1 with the handset removed showing the hookswitch in phantom in the "off-hook" condition.

A hookswitch 56 (FIGS. 7 and 8) is mounted in the cradle 28. The leas wires 58 for the hookswitch are strung behind the concave surface of the lever arm 30 so that the hookswitch can be connected into the electrical circuit elements within the telephone set. The hookswitch 56 includes a plurality of resilient contact carriers 60 and a movable cam 62 engaging the carriers. The cam 62 is pivotally attached to the cradle 28 by pin 64 (FIGS. 4 and 6) so that it can pivot between an "off-hook" position (FIGS. 2, 5 and 6) and an "on-hook" position (FIG. 4). A spring 61 is mounted on the cam pivot 64 to apply a force against the cam 62 to urge the cam 62 outward to the "off-hook" position in which an end 68 of the cam 62 (FIG. 5) projects through a substantially rectangular aperture 66 into the yoke of the cradle contact carrier 60 also urges against the tapered portion of the cam 62. The cam 62 has limit stops 70 (FIG. 6) which engage the cradle 28 to limit the outward movement of the cam 62 to the "off-hook" position illustrated in FIG. 6.

When the handset 26 is placed in the cradle 28, the receiver portion is captured by the cradle yoke and the weight of the handset 26 overcomes the resilient force of the spring 61 and the contact carriers 60 and pivots the cam 62 to the "on-hook" condition (FIG. 4).

The resilience of the spring 61 and of the contact carriers 60 can be made substantially less than that of the spring 50 to make possible a switching sequence wherein the hookswitch 56 is first actuated and the hold buttons 22 *a–c* are subsequently released to prevent undesirable switching noises.

Figure 8:
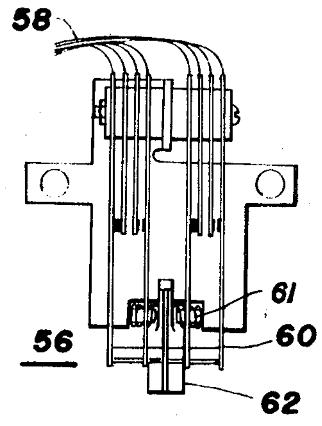
FIG. 8 shows the contacts of the hookswitch of FIG. 6 in the "off-hook" condition.

In operation, when the handset 26 is removed from the cradle 28, the hookswitch 56 is placed in the "off-hook" condition by the resilient force of the spring 61 and the contact carriers 60 and the cam 62 is pivoted out from within the cradle (FIG. 8). In addition, the lever arm 30 is pivoted towards the stop 36 by the spring 50 thereby positioning the cam 24 so that the hold buttons 20 *a—c* in the button assembly 16 can be operated. When the telephone calls are completed, the handset 26 is placed in the cradle 28. The handset first engages the cam 62 to overcome the resilient force of the spring 61 and the contact carriers 60 to pivot the cam 62 into the cradle and position the hookswitch 56 in the "off-hook" condition (FIG. 7) and then subsequently engages the yoke of the cradle 28. The weight of the handset 26 in the cradle causes the lever arm 30 to pivot toward the stop 38 to move cam 24 in the direction to release any depressed hold buttons.

It is preferred that the spring 50 be a constant-force spring of the type wherein its resilient force remains relatively constant over its expected range of operation (the pivotal range of movement of the lever arm 30) rather than the usual type of spring wherein the resilient force varies with its displacement. If the usual type of spring is used, the resilient force of the spring changes with the position of the lever arm 30. In such a case, the force of the spring decreases as the lever arm 30 pivots upward and increases as the lever arm pivots downward. The resilient force provided by the spring 50 must be sufficient to pivot the lever arm 30 up to the limit stop 36 with sufficient force to simultaneously actuate the hold button release mechanism (when the handset is removed), and in addition, the spring 50 must be overcome to a sufficient degree by the weight of the handset 26 to allow the lever arm 30 to pivot down to the limit stop 38 and be stably maintained in this position. Furthermore, the spring 50 is required to operate correctly over the wide range of tolerances expected from mass-produced telephone sets and over long periods of time and use so that subsequent readjustment is not required. Hence, the usual type of spring must be manufactured with close tolerance limits to assure proper operation and so that the relative difference between the resilient force of the spring 50 and the contact carriers 60 and the spring 61 of the hookswitch remains substantially constant for proper sequential switching operation.

In contrast, when a constant-force spring is used, its resilient force is relatively constant throughout the range of pivotal movement of the lever arm 30. This greatly simplifies design since the force provided by the spring need only be selected to assure that the lever arm can be pivoted against the upper limit stop 36 when the handset is removed from the cradle and that the resilient force of the spring is substantially less than the weight of the handset. Since the resilient force of the constant force spring 50 does not substantially change with the position of the lever arm 30, the lever arm 30 is assured to pivot toward the lever stop 38 with sufficient force to actuate the button of the release mechanism. Furthermore, such a spring can be manufactured with wide tolerance limits and still fall within the range required for proper operation.

It should be noted, that the arrangement of the hookswitch and hold button release mechanism can be such that the weight of the handset provides for the separate and sequential actuation of the hookswitch and the hold button release mechanism. This can provide a positive and accurate type of switching sequence wherein the operation of the hookswitch does not depend upon the operation of the lever assembly that operates the hold button release mechanism. The separate actuation of the hookswitch provides a large degree of tolerance in the manufacture of the lever assembly since its movement is not required to assure the actuation of the critical hookswitch and therefore does not require any fine adjustments. Hence, the lever assembly can be manufactured at a minimum of cost and is very simply assembled requiring a minimum of adjustments (if any) and still provides trouble-free and reliable operation according to the high standards required by the telephone industry.

From the foregoing description, it will be apparent that there has been provided an improved hookswitch and hold button release mechanism for multiline wall telephone set. While an exemplary embodiment of the invention has been shown and described, it will be appreciated that variations and modifications thereof within the spirit and scope of the invention will undoubtedly suggest themselves to those skilled in the art. Accordingly, the foregoing description should be taken merely as illustrative and not in any limiting sense.

What is claimed is:

1. A hookswitch and hold button arrangement for multiline telephone sets comprising:

- a line select and hold button switch assembly with a hold button release mechanism;
- a handset cradle for receiving and holding a telephone handset;
- a hookswitch mounted in said handset cradle and adapted for actuation by a handset placed in said cradle;
- lever means coupling said handset cradle to said hold button release mechanism, and
- resilient means for urging said lever means in a direction for positioning said release mechanism so that the hold buttons can be operated, the arrangement being such that when a handset is placed in said cradle, the weight of said handset actuates the hookswitch and overcomes said resilient means to move said lever means in a direction to operate said button release mechanism.

2. A multiline wall telephone set comprising:

- a line select and hold button switching assembly having at least one hold button with hold and release positions;
- hold button release means having a first position for placing said hold button in said release position, and having a second position wherein said hold button is operable to be placed in said hold position;

a handset;

a cradle for receiving and holding said handset;

movable means connecting said cradle to said release means so that the weight of said handset when positioned in said cradle places said release means in said first position;

a spring-biased hookswitch mounted in said cradle so that said hookswitch is actuated by the weight of said handset when positioned in said cradle, and resilient means for urging said movable means to place said release means in said second position, said resilient means providing a force less than, and oppositely directly from, the weight of said handset when positioned in said cradle, and greater than the spring-bias on said hookswitch, the arrangement being such that said release means releases any hold button from its hold position subsequent to actuating said hookswitch.

3. A hookswitch and hold button arrangement for multiline telephone sets comprising:

a line select and hold button switch assembly including at least one hold button having hold and release positions;

a hold button release mechanism mounted in said switch assembly for movement between a first position wherein said release mechanism switches any hold button in said hold position to said release position, and a second position wherein said hold button is free to be switched to said hold position;

a lever arm mounted for pivotal movement between first and second limit stops;

a cradle for receiving and holding the telephone handset mounted in said lever arm;

resilient means coupled to said lever arm for urging said lever arm in the direction of said first limit stop;

means coupling said release mechanism to said lever arm so that when said lever arm is pivoted toward said first limit stop said release mechanism is moved toward said first position, and when said lever arm pivots toward said second limit stop said release mechanism is moved toward said second position, and a spring-biased hookswitch mounted in said cradle for actuation by a handset placed in said cradle, said spring-bias being substantially less than the force of said resilient means so that when a handset is positioned in said cradle, the weight of the handset first actuates said hookswitch and subsequently overcomes the force of said resilient means to pivot said lever arm toward said first limit stop.

4. A hookswitch and hold button release mechanism for multiline wall telephone sets comprising:

a baseplate adapted for mounting on a vertical member;

a handset;

a line select and hold button assembly mounted on said baseplate, said assembly having at least one hold button having hold and release positions;

a hold button release mechanism coupled to said button assembly for movement between a first position wherein said release mechanism switches any hold button in said hold position to said release position, and a second position wherein said release mechanism allows any hold button to be placed in said hold position;

a lever mounted on said baseplate for pivotal movement in a plane substantially parallel to said baseplate, said lever being movable between first and second limit stops;

means coupling said release mechanism to said lever so that when said lever is pivoted towards said first limit stop said release mechanism is moved towards said first position, and when said lever pivots toward said second limit stop said release mechanism is moved toward said second position;

a cradle fixedly mounted in said lever for receiving and holding the receiver portion of said handset so that said handset, when positioned in said cradle is generally vertically disposed having its weight vector extending substantially parallel to said plane;

a hookswitch mounted in said cradle for actuation by said handset receiver when placed in said cradle, and resilient means coupled to said lever for pivoting said lever in the direction of said second limit stop when said handset is removed from said cradle, and when said handset is positioned in said cradle its weight is sufficient to overcome said resilient means to pivot said lever against said first limit stop.

5. The hookswitch and hold button release mechanism for multiline wall telephone sets as set forth in claim 4 wherein:

said coupling means includes a second lever pivotally mounted on said baseplate and first and second rods wherein said first rod is connected between said lever and said second lever and said second rod being connected between said release mechanism and said second lever.

6. The hookswitch and hold button release mechanism for multiline wall telephone sets as set forth in claim 5 wherein the connection of at least one of said rods to said second lever includes means for adjusting the effective length of at least one of said rods.

7. The hookswitch and hold button release mechanism for multiline wall telephone sets as set forth in claim 4 wherein said resilient means comprises a constant-force spring having one end connected to said lever and the other end connected to said baseplate.

8. The hookswitch and hold button release mechanism for multiline wall telephone sets as set forth in claim 6 wherein said hold button has a projection at right angles to its direction of movement and said release mechanism is a linear cam having triangular projections for engaging said button projections.

9. A hookswitch and hold button release mechanism for multiline wall telephone sets as set forth in claim 7 wherein;

said hookswitch is a spring-biased hookswitch, and the resilient force of said constant-force spring is substantially greater than the force of said spring-bias of said hookswitch so that when said handset is positioned in said cradle the handset actuates said hookswitch ans subsequently pivots said lever to said first limit stop.